United States Patent
Stingl

[11] 3,821,200
[45] June 28, 1974

[54] NITRODIPHENYLAMINE DYESTUFFS

[75] Inventor: Hans Alfred Stingl, Brookside Heights, N.J.

[73] Assignee: Toms River Chemical Corporation, Toms River, N.J.

[22] Filed: Jan. 16, 1968

[21] Appl. No.: 698,099

[52] U.S. Cl. ... 260/239.7, 260/397.7 R, 260/556 B, 260/268 S, 8/1 C, 8/1 D, 8/179, 8/DIG. 4, 8/21 C, 8/4, 8/5
[51] Int. Cl............................................. C07d 51/70
[58] Field of Search ....... 260/397.7 R, 556 B, 239.7

[56] References Cited
UNITED STATES PATENTS

| | | | |
|---|---|---|---|
| 1,915,334 | 6/1933 | Salzberg et al. | 260/243 |
| 2,075,359 | 3/1937 | Salzberg et al. | 424/250 |
| 2,258,162 | 10/1941 | Northey et al. | 260/397.7 |
| 2,595,017 | 4/1952 | Sprung et al. | 260/397.7 |
| 2,741,658 | 4/1956 | Schmid et al. | 260/397.7 |
| 2,773,765 | 12/1956 | Sus et al. | 260/556 B |

Primary Examiner—Henry R. Jiles
Assistant Examiner—S. D. Winters
Attorney, Agent, or Firm—Joseph G. Kolodny; Stanley A. Marcus; Dr. Edward McC. Roberts

[57] ABSTRACT

Nitrodiphenylamine compounds of the formula

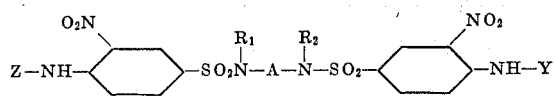

wherein A represents a single bond or a divalent radical which is an aliphatic straight or branched chain hydrocarbon of from one to 12 carbon atoms, a meta- or para-phenylene radical, a paradiphenylene radical or a radical of the formula

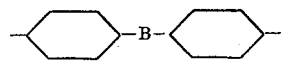

in which B is $CH_2$, O, S or $N-R_5$; $R_1$, $R_2$ and $R_5$ represent hydrogen, lower alkyl such as methyl, ethyl, propyl or butyl, hydroxyalkyl, particularly hydroxy lower alkyl such as hydroxymethyl, hydroxyethyl, hydroxypropyl or hydroxybutyl, cycloalkyl such as cyclohexyl, phenyl or when A is alkylene $R_1$ and $R_2$ together are alkylene; Y and Z can be the same or different and are selected from the group consisting of cyclohexyl, the radical of the formula

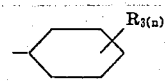

and the radical of the formula

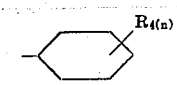

wherein $n$ is 0, 1, 2 or 3 and $R_3$ and $R_4$ are hydrogen, lower alkyl such as methyl, ethyl, propyl or butyl, hydroxy lower alkyl, lower alkoxy such as methoxy, ethoxy, propoxy or butoxy, halogen such as chlorine or bromine, trifluoromethyl or acylamino such as acetylamino, carbamoyl or sulfamoyl, and $R_3$ and $R_4$ can be in ortho, meta or para position, are yellow dyestuffs particularly suitable for the dyeing and printing of synthetic fibers.

9 Claims, No Drawings

NITRODIPHENYLAMINE DYESTUFFS

BACKGROUND OF THE INVENTION

It is known to employ dyestuffs of the general formula

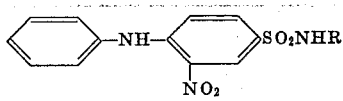

where R is hydrogen or phenyl for the dyeing of artificial fibers. However, the dyeings which are obtained are not completely satisfactory in their fastness properties and, in particular, do not possess the desired sublimation fastness.

This limitation is of particular importance in the dyeing of the polyester fibers.

Polyester fibers present particular dyeing problems, arising at least in part out of the hydrophobic nature of such fibers. In the dyeing of polyester fibers, the class of dyes known as disperse dyestuffs has come to have the widest application. These dyestuffs are essentially water-insoluble products applied in a finely divided condition from a dispersion. In the application of such dyestuffs, the dyeing difficulties associated with polyester fibers have been met by the development of special methods for the application of disperse dyes to the fibers. Of these methods, the one known as the Pad/-Thermofix method has become of increasing importance since it is particularly adapted for high-speed, continuous dyeing operations. In this method, a fabric is padded by passing it through an aqueous suspension of the dyestuff and squeezing the fabric between closely-set rollers in order to remove excess dye liquor. The dyestuff is only loosely attached to the fiber at this point. The dyestuff is then fixed on the fiber by subjecting the material to a short, intensive heat-treatment at elevated temperatures of the order of about 120–220°C. It is evident that a dyestuff, in order to be suitable for application by this method, must be fast to sublimation or else it will wholly or partially volatilize from the fiber during the heat-treatment step.

SUMMARY OF THE INVENTION

In accordance with the present invention, it has been found that valuable dyeings and printings are produced on fibrous materials of aromatic polyesters, especially polyethylene terephthalate, by using as dyestuffs nitrodiphenylamine compounds of the formula

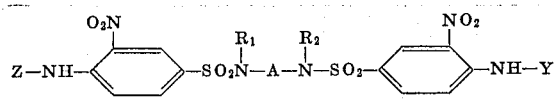

wherein A represents a single bond or a divalent radical which is an aliphatic straight or branched chain hydrocarbon of from one to 12 carbon atoms, a meta- or para-phenylene radical, a paradiphenylene radical or a radical of the formula

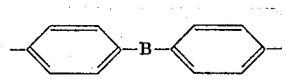

in which B is $CH_2$, O, S or $N-R_5$; $R_1$, $R_2$ and $R_5$ represent hydrogen, lower alkyl such as methyl, ethyl, propyl or butyl, hydroxyalkyl, particularly hydroxy lower alkyl such as hydroxymethyl, hydroxyethyl, hydroxypropyl or hydroxybutyl, cycloalkyl such as cyclohexyl, phenyl or when A is alkylene $R_1$ and $R_2$ together are alkylene; Y and Z can be the same or different and are selected from the group consisting of cyclohexyl, the radical of the formula

and the radical of the formula

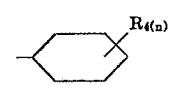

wherein $n$ is 0, 1, 2 or 3 and $R_3$ and $R_4$ are hydrogen, lower alkyl such as methyl, ethyl, propyl or butyl, hydroxy lower alkyl lower alkoxy such as methoxy, ethoxy, propoxy or butoxy, haloen such as chlorine or bromine, trifluoromethyl or acylamino such as acetylamino, carbamoyl or sulfamoyl, and $B_3$ and $R_4$ can be in ortho, meta or para position.

The aromatic rings repesented by the symbol A can be substituted by the same substituents as are recited in the definition of $R_3$ and $R_4$.

DESCRIPTION OF THE PREFERRED EMBODIMENT

The nitrodiphenylamines of the present invention are prepared by combining compounds of the formula

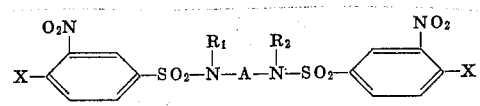

wherein A, $R_1$ and $R_2$ have the meanings given above and X is halogen, preferably chlorine, with aromatic amines of the formulae

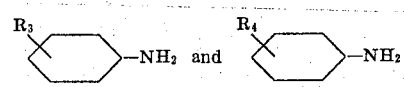

where $R_3$ and $R_4$ have the meanings ascribed above and can be the same or different.

Instead of the aromatic amine reactants mentioned in the preceding paragraph, certain aliphatic amines can also be employed. Exampes of these amines are 3-methoxypropylamine and especially cyclohexylamine. The dyestuffs obtained when these amines are employed as reactants produce bright greenish yellow dyeings of excellent sublimation fastness and good light fastness.

The compounds of the formula

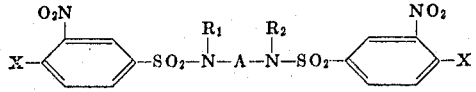

are prepared by acylating a primary or secondary diamine of the formula

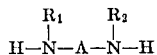

where $R_1$, $R_2$ and A have the meanings given above with a suitable acylating agent, such as 3-nitro-4-chlorobenzenesulfonyl chloride in aqueous medium or with solvent with or without heating and, preferably, in the presence of a proton acceptor.

For dyeing, the said dyestuffs are preferably used in a finely divided form and the dyeing is carried out in the presence of a dispersing agent, such as sulphite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example, by grinding the dyestuff(s) either in dry or wet form with or without the addition of a dispersing agent.

The dyestuffs used in the invention are especially suitable for dyeing by the so-called thermofixation or Pad/Thermofix method, in which the fabric to be dyed is impregnated advantageously at a temperature not exceeding 60°C with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100°C, for example, at a temperature ranging from 120–220°C, it being of advantage to dry the fabric prior to this treatment, for example, in a current of warm air.

The thermofixation mentioned above is of special interest for the dyeing of mixed fabrics of polyester fibers and cellulose fibers, expecially cotton. In this case, in addition to the dyestuff to be used in the process of the invention, the padding liquor contains a dyestuff suitable for dyeing cotton, for example, a direct dyestuff or vat dyestuff, or a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used, the padded fabric must be treated, after the heat treatment, with an aqueous alkaline solution of a reducing agent of the kind used in vat dyeing.

The dyeings produced on polyester fibers by the process of the invention are advantageously given an aftertreatment, for example, by heating them with an aqueous solution of a non-ionic detergent.

Instead of applying the dyestuffs in the process by impregnation, they may be applied by printing. For this purpose, a printing color is used which, in addition to the usual printing assistants, such as wetting and thickening agents, contains the finely dispersed dyestuff, if desired, in admixture with one of the aforesaid cotton dyestuffs, and, if desired, in the presence of urea and/or an agent capable of binding acid.

There are obtained by the practice of the present invention strong yellow dyeings or prints of attractive shade and good color build-up having excellent fastness properties, especially a good fastness to sublimation and to light. The introduction of permanent crease fabrics has lent still further emphasis to the importance of sublimation fastness since the processes involved in the preparation of such fabrics require the curing at elevated temperatures for prolonged periods of the resin finishes applied for the achievement of permanent crease characteristics.

The term polyester defines synthetic polymeric polyesters, such as the highly polymeric linear polyesters, the molecules of which have recurring monomeric units connected by ester linkages. Dibasic acids, for example, aromatic acids, such as terephthalic acid, diphenyl-4,4'-dicarboxylic acid and/or diphenylsulfone-4,4'-dicarboxylic acid and dihydroxy compounds, for example, glycols, such as ethylene glycol, diethylene glycol, triethylene glycol, propylene glycol and/or butylene glycol, as well as other diols, such as 1,4-cyclohexyldiol can be used as the monomers to form the polymeric polyesters. Typical commercial examples of such fibers are DACRON, TERYLENE, FORTREL, TREVIRA, TERLANCA, KODEL, VICRON, etc. They are disclosed, for example, in U.S. Pat. No. 2,901,466 and British Patents Nos. 578,079; 579,462; 588,497 and 596,688.

The present invention is, of course, equally applicable to the dyeing of blends of polyester fibers and cellulosic fibers. The latter term includes native cellulose, such as linen or, more particularly, cotton, as well as regenerated cellulose, such as viscose of cuprammonium rayon.

The dyestuffs of the present invention are also suitable for coloring a wide variety of organic products, for example, plastic substances such as rubber, casein, polymerisation resins such as polyvinyl chloride and its copolymers, polyvinyl acetals, polyethylene, polypropylene, polystyrene and its copolymers with polyesters from unsaturated dicarboxylic acids and diols, polyacrylates and their copolymers, silicone and silicone resins. Furthermore, the pigments to be used according to the present invention are suitable for the manufacture of colored condensation resins, especially aminoplasts, for example urea formaldehyde or melamine formaldehyde resins, polyaddition resins such as epoxy or polyurethane resins or alkyd resins, and for the manufacture of colored lacquers containing one or more of the resins mentioned in an organic solvent, or aqueous emulsions containing one or more of the said resins or precondensates, if desired in the presence of an organic solvent, for example, an oil-in-water or water-in-oil emulsion. Such emulsions are particularly suitable for impregnating or printing textile materials or other flat materials such as paper, leather or glass fiber fabrics, if necessary followed by curing with application of heat. The pigments to be used according to the present invention may also be used for the manufacture of spindyed fibers, for example, of viscose rayon, cellulose esters or polyacrylonitrile. They can also be used with advantage in the manufacture of cosmetics.

The following examples illustrate the invention.

EXAMPLE 1

Fifty g. by weight of N,N'-ethylene-bis-4-chloro-3-nitrobenzene-1-sulfonamide, 22 g. of aniline, 50 g. of anhydrous sodium acetate, and 650 g. of 95% ethanol are stirred for 24 hours at 130°C in an autoclave. The reaction mass is cooled, filtered and washed with ethanol. The collected precipitate is washed with hot water, filtered, and washed until free of salts. The product N,-N'-ethylene-bis-4-phenylamino-3-nitrobenzene-1-sulfonamide, obtained in a yield of 45 g., gives yellow dyeings on polyester fibers.

The N,N'-ethylene-bis-4-chloro-3-nitrobenzene-1-sulfonamide employed above is prepared in the following manner:

Six g. by weight of ethylenediamine are dissolved in 60 g. of water at 2°C. To this solution there are added over a period of 15 minutes, with stirring, 73 g. of a wet paste containing 51 parts of 4-chloro-3-nitrobenzene-1-sulfonyl chloride and the balance water. The mixture is heated, with agitation, during 30 minutes, to 60°C. The neutrality is then maintained over 2 hours by the gradual addition of 16.5 g. of a 50% by weight solution of sodium hydroxide in water. The precipitate is recovered by filtration and washed thoroughly with water. 45 g. by weight of product are obtained, recrystallized from ethanol and collected as a colorless crystalline powder melting at 221–222.5°C.

EXAMPLE 2

51.4 g. by weight of N,N'-methylethylene-bis-4-chloro-3-nitrobenzene-1-sulfonamide and 22.5 g. of aniline are added to a solution of 110 g. sodium acetate in 73 g. water at 90°C and heated for 20 hours at 120°C with stirring. The reaction mixture is diluted with 80 g. of water and filtered. The solids are washed thoroughly with hot water and dried. 60.5 g. of N,N'-methylethylene-bis-4-phenylamino-3-nitrobenzene-1-sulfonamide giving yellow shades on polyester fibers are obtained.

EXAMPLE 3

54.6 g. of N,N'-p-phenylene-bis-4-chloro-3-nitrobenzene-1-sulfonamide and 22.5 g. of aniline are added to a solution of 110 g. sodium acetate in 73 g. water at 90°C and heated for 20 hours at 120°C with stirring. The reaction mixture is diluted with 80 g. of water and filtered. The solids are washed thoroughly with hot water and dried. 59 g. of N,N'-p-phenylene-bis-4-phenylamino-3-nitrobenzene-1-sulfonamide, giving yellow shades on polyester fibers are obtained.

The N,N'-p-phenylene-bis-4-chloro-3-nitrobenzene-1-sulfonamide emp,oyed above is prepared in the following manner:

To a stirred mixture of 11 g. by weight of p-phenylenediamine, 24 g. of anhydrous sodium acetate and 45 g. of acetone there are added, with external cooling, at 10–25°C, 73 g. of a wet paste containing 51 g. of 4-chloro-3-nitrobenzene-1-sulfonyl chloride and the balance water. The reaction mass is heated and a temperature of 55°C is maintained for 30 minutes. The reaction mass is diluted with water, filtered, the precipitate washed with ethanol, and then with hot water.

EXAMPLE 4

Fifty g. by weight of N,N'-ethylene-bis-4-chloro-3-nitrobenzene-1-sulfonamide and 24 g. of cyclohexylamine are added to a solution of 120 g. of sodium acetate in 80 g. of water at 90°C and heated for 18 hours at 116°C with stirring. The reaction mixture is diluted with 200 g. of water and filtered. The solids are washed thoroughly with hot water and dried. 58 g. of N,N'-ethylene-bis-4-cyclohexylamino-3-nitrobenzene-1-sulfonamide giving greenish-yellow shades on polyester fibers are obtained.

EXAMPLE 5

51.3 g. by weight of N,N'-(1,3-propylene-bis)-4-chloro-3-nitrobenzene-1-sulfonamide and 22 g. of 3-methoxypropylamine are stirred in a solution of 120 g. of sodium acetate in 80 g. of water at 116°C for 18 hours. The reaction mixture is diluted with 250 g. of water, cooled until the oily product solidifies, and filtered. The solids are thoroughly washed with water, and then with hot methanol. 52.5 g. of N,N'-(1,3-propylene-bis)-4-α-methoxypropylamino-3-nitrobenzene-1-sulfonamide giving greenish-yellow shades on polyester fibers are obtained.

EXAMPLE 6

The dyes listed below are prepared by the method of Example 1. They give yellow dyeings on polyester fibers characterized by good penetration and excellent fastness to light and sublimation.

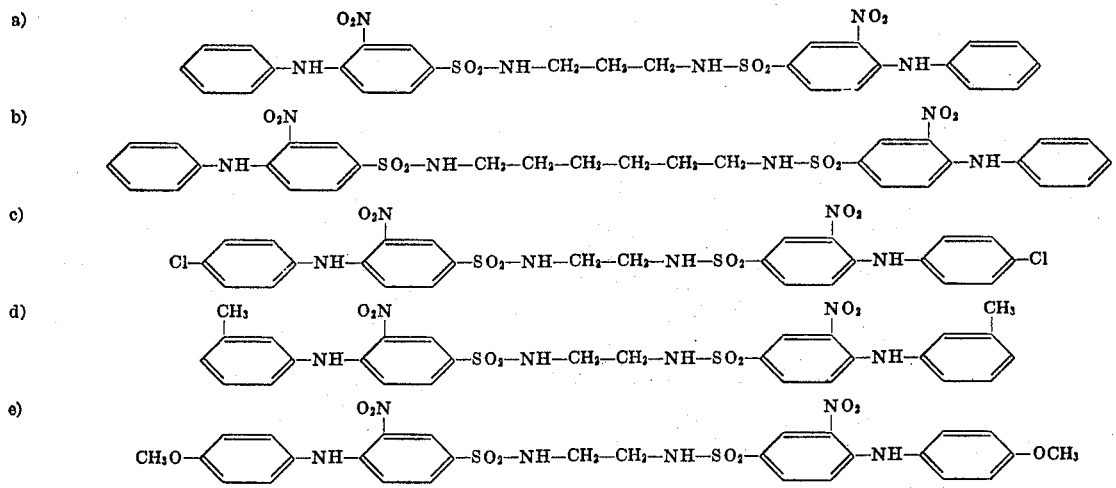

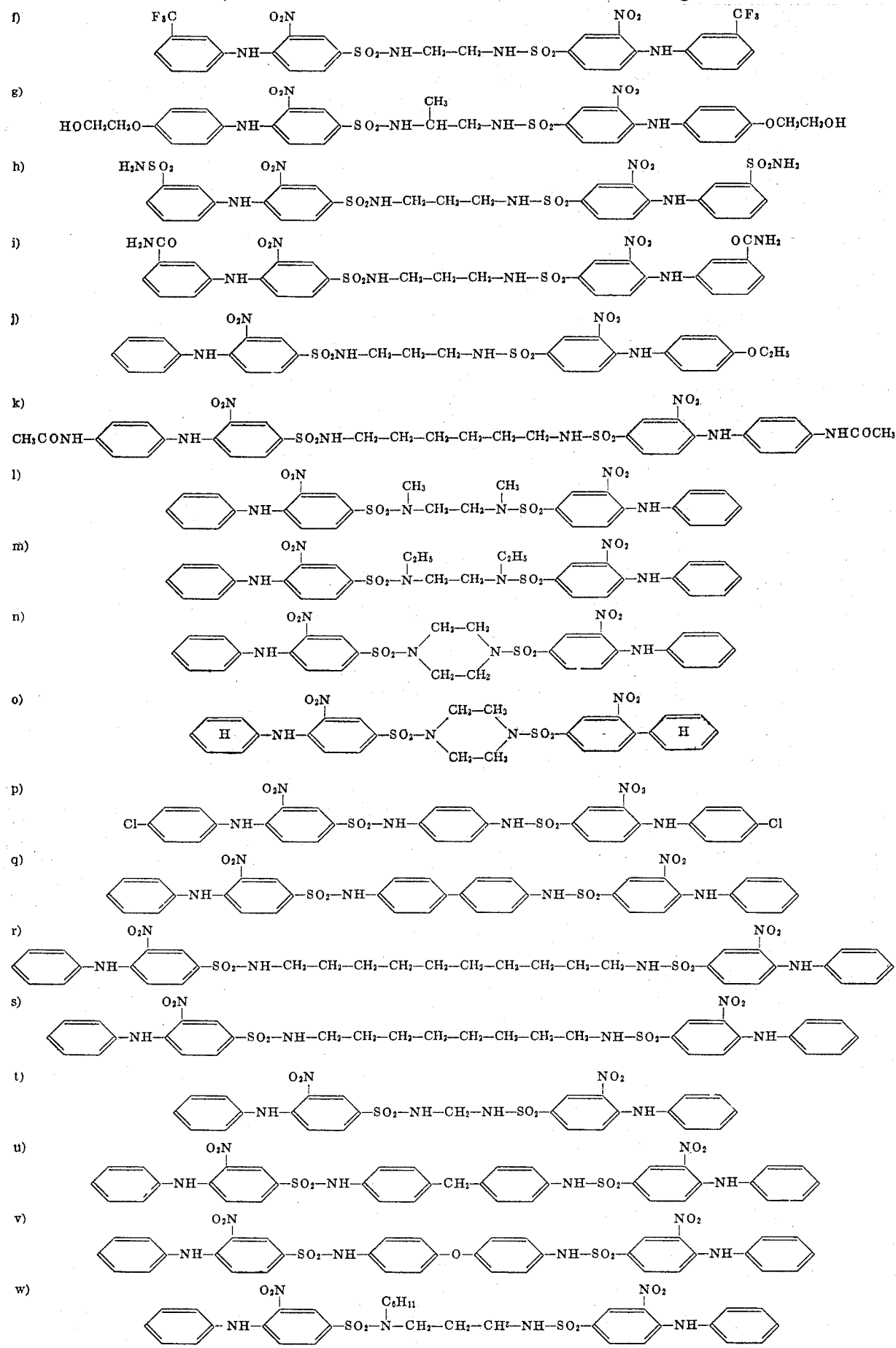

x) 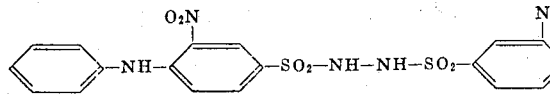

y) 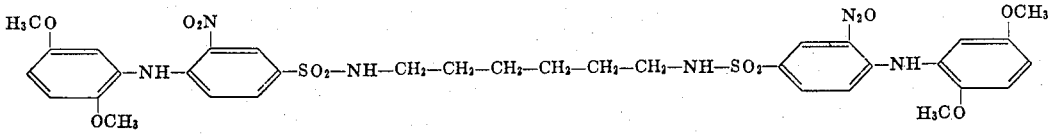

EXAMPLE 7

Fifteen g. of N,N'-ethylene-bis-4-phenylamino-3-nitrobenzene-1-sulfamide (Example 1) are brought to a state of fine dispersion by milling in a ball mill with 10 parts of the condensation product of naphthalene-2-sulfonic acid with formaldehyde and 75 g. of water.

An aqueous preparation containing 67 g. of the above dyestuff dispersion and 0.5 g. of sodium alginate per liter is padded onto fabric of polyethylene terephthalate fiber and squeezed to 65% pick-up. The padded material is then air dried and subsequently heat dried at 220°C for 1 minute. The dyed fabric is scoured for 5 minutes at the boil in a solution containing 3% of sodium di-iso-butylnaphthalene monosulfate and 5% sodium carbonate and then dried. A yellow dyeing is obtained, characterized by good penetration and excellent fastness to light and sublimation.

EXAMPLE 8

The procedure of Example 7 is repeated, except that 15 g. each of the yellow dyes listed in Examples 2–6 are employed for the dispersion. A yellow dyeing is obtained in each instance characterized by good penetration and excellent fastness to light and sublimation.

The procedure of Example 7 is repeated, except that a total of 15 g. of each of the dyes of Examples 2 and 3 are employed. Satisfactory dyeings are obtained. Combinations of the other dyestuffs as mentioned in Examples 2–6 can be similarly employed.

I claim:

1. A compound of the formula

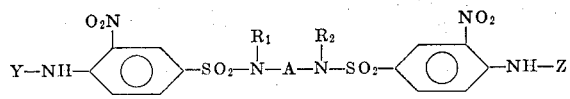

wherein A is a single bond, para-diphenylene or a radical of the formula

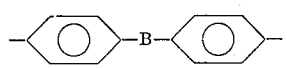

in which B is —CH$_2$—, —O— or —S—; wherein each of said phenyl groups may be substituted by lower alkyl, hydroxy lower alkyl, lower alkoxy, halogen, trifluoromethyl, lower alkanolylamino, carbamoyl or sulfamoyl; or when R$_1$ and R$_2$ together are ethylene A is ethylene; R$_1$ and R$_2$ are individually hydrogen, lower alkyl, hydroxy lower alkyl, cyclohexyl, phenyl or, when A is ethylene R$_1$ and R$_2$ together are ethylene; Y and Z are individually a radical of the formula

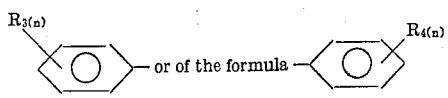

wherein $n$ is 1, 2 or 3 and R$_3$ and R$_4$ are individually hydrogen, lower alkyl, hydroxy lower alkyl, lower alkoxy, halogen, trifluoromethyl, lower alkanoylamino, carbamoyl or sulfamoyl.

2. A compound of the formula

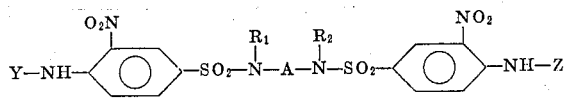

wherein A is a single bond, straight-chain alkylene of 1–12 carbon atoms, branched-chain alkylene of 1–12 carbon atoms m-phenylene, p-phenylene, para-diphenylene or a radical of formula

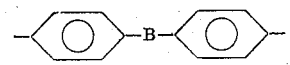

in which B is —CH$_2$—, —O— or —S— wherein each of said phenyl groups may be substituted by lower alkyl, hydroxy lower alkyl, lower alkoxy, halogen, trifluoromethyl, lower alkanoylamino, carbamoyl or sulfamoyl; R$_1$ and R$_2$ are individually hydrogen, lower alkyl, hydroxy lower alkyl, cyclohexyl, phenyl or, when A is ethylene, R$_1$ and R$_2$ together are ethylene; Y and Z are cyclohexyl or 3-methoxypropyl.

3. A compound according to claim 1 of formula

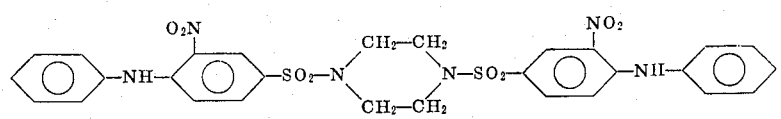

4. A compound according to claim 1 of formula

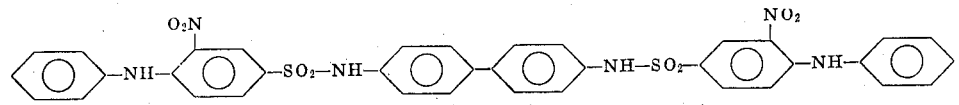

5. A compound according to claim 1 of formula

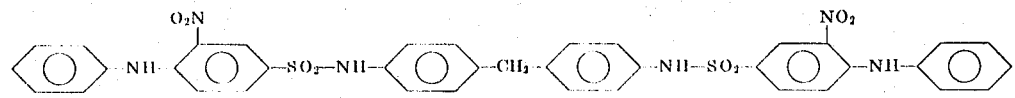
6. A compound according to claim 1 of formula
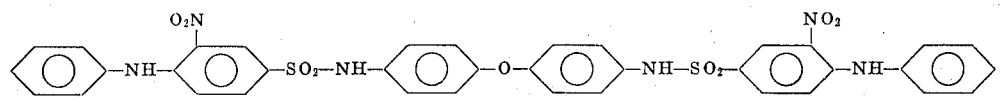
7. A compound according to claim 1 of formula
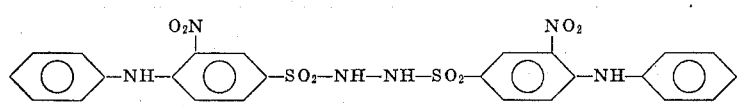
8. A compound according to claim 2 of formula
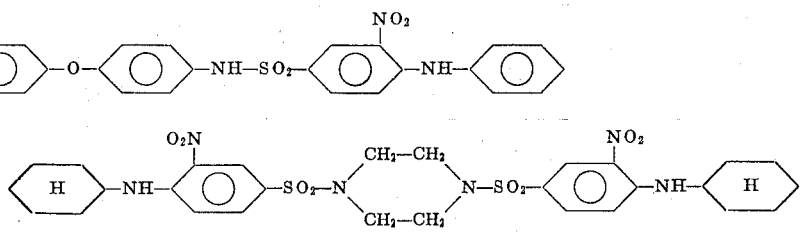
9. A compound according to claim 2 of formula
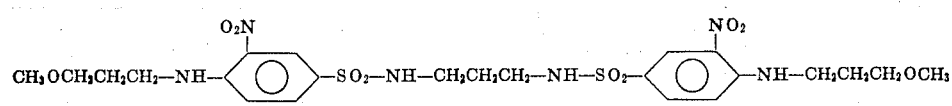
* * * * *